US011881009B2

(12) United States Patent
Jones

(10) Patent No.: US 11,881,009 B2
(45) Date of Patent: *Jan. 23, 2024

(54) IMAGE DIFFERENCE GENERATOR

(71) Applicant: BrowserStack Limited, Dublin (IE)

(72) Inventor: David Jones, San Francisco, CA (US)

(73) Assignee: BrowserStack Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,321

(22) Filed: Dec. 29, 2022

(65) Prior Publication Data

US 2023/0316705 A1 Oct. 5, 2023

Related U.S. Application Data

(63) Continuation of application No. 17/708,921, filed on Mar. 30, 2022, now Pat. No. 11,625,908.

(51) Int. Cl.
*G06T 5/50* (2006.01)
*G06V 10/75* (2022.01)
*G06T 11/60* (2006.01)
*G06T 3/40* (2006.01)
*G06F 8/20* (2018.01)

(52) U.S. Cl.
CPC .......... *G06V 10/751* (2022.01); *G06T 3/4023* (2013.01); *G06T 5/50* (2013.01); *G06T 11/60* (2013.01); *G06F 8/20* (2013.01)

(58) Field of Classification Search
CPC ....... G06V 10/751; G06T 3/4023; G06T 5/50; G06T 11/60; G06F 8/20
USPC ...................................................... 348/222.1
See application file for complete search history.

(56) References Cited

U.S. PATENT DOCUMENTS

| 7,957,612 | B1 * | 6/2011 | Ohba | ........................ G06T 1/00 |
| | | | | 382/305 |
| 2009/0086051 | A1 * | 4/2009 | Hagiwara | .............. H04N 25/00 |
| | | | | 348/222.1 |
| 2019/0208218 | A1 * | 7/2019 | Agostinelli | .......... H04N 19/184 |

* cited by examiner

*Primary Examiner* — Stephen P Coleman
(74) *Attorney, Agent, or Firm* — Cognition IP, P.C.; Edward Steakley; Saleh Kaihani

(57) ABSTRACT

A software development infrastructure can enable user developers to select remote hardware devices to develop and test their software programs. For some tests and development activity, physical access to the remote device can be provided by the infrastructure administrator by replacing the internal calls of an application with mimic code, which can respond to application requests for sensor data, as if the user was physically handling the remote device at the same location.

20 Claims, 5 Drawing Sheets

IMAGE DIFFERENCE GENERATOR

CROSS REFERENCE TO RELATED APPLICATIONS

This application is a continuation of U.S. application Ser. No. 17/708,921 filed on Mar. 30, 2022, titled "IMAGE DIFFERENCE GENERATOR," the contents of which are incorporated herein by reference in their entirety and should be considered a part of this specification.

BACKGROUND

Field

This invention relates generally to the field of image processing, and more particularly to image processing in the field of software development.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Image processing plays a role in software development. Some software can produce an output in the form of a visual display that is viewable on a monitor of a computing device, such as a desktop computer monitor, mobile device monitor and other devices having a monitor. Typically, a monitor displays an image from output received from a software by illuminating pixels, according to the pixel values, such as color, luminance, and other parameters, defined by the software, the operating system and/or hardware display drivers of the computing device running the software. Software developers whose products have a visual display output are in some cases interested in comparing the output of various program runs and detecting changes in their display output. Beyond, the context described above, various fields of technology may also be interested in comparing two display outputs and detecting the changes in the display output. In these and similar contexts, receiving an indication of changes between display outputs can be useful. Consequently, systems and methods that can receive display outputs and indicate changes between them can be used by software developers and have applications in other fields of technology.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

DETAILED DESCRIPTION

Figure 1:
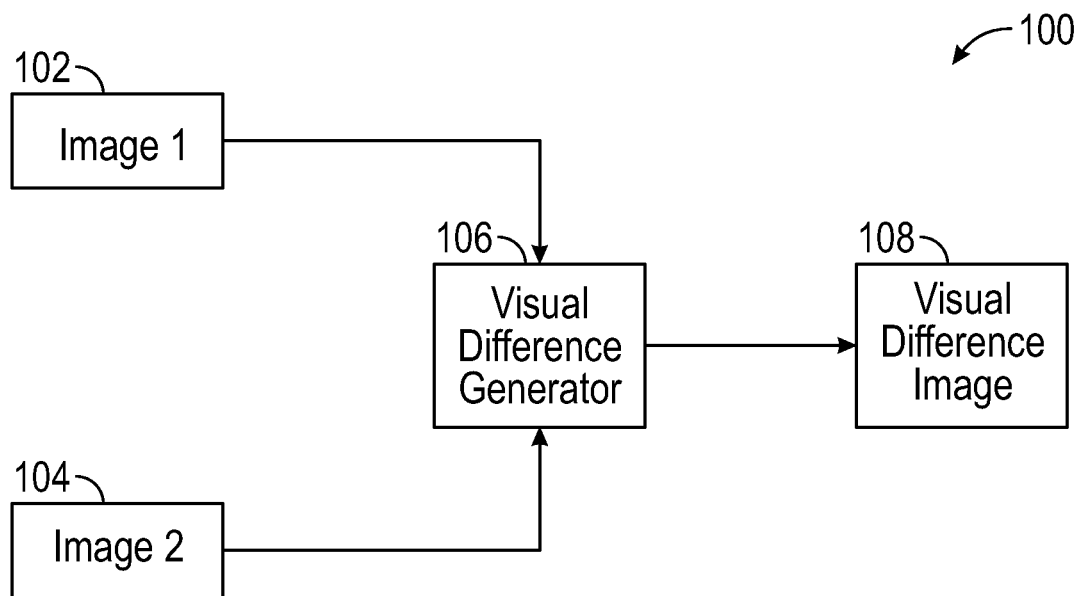
FIG. 1 illustrates a diagram of a visual difference generator (VDG).

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Software developers, particularly website, web application and mobile device application developers have a desire to test their products on a multitude of hardware and software platforms that their target audience may use. A variety of mobile device manufacturers provide the hardware consumers and businesses use. Examples include, devices manufactured by Apple Inc., Google LLC, Samsung Electronics Co. Ltd., Huawei Technologies Co. Ltd. and others. Similarly, a variety of operating systems for consumer electronic devices exist. Examples include Apple iOS®, Android® operating system (OS), and Windows® Mobile, Windows® Phone and others. Furthermore, end-users have a variety of choices as far as the web browser application they can use. Examples include Safari®, Chrome®, FireFox®, Windows Explorer®, and others. This variety of choice presents a difficult challenge for a web/app developer to test and develop products on potential target devices. For example, the developer, in some cases, would like to compare the display output of their product on a variety of platforms.

Beyond differences in platform, software developers may also be interested in comparing the output display of their programs during a typical development cycle. For example, a developer may like to compare the output display of one version of the program against the output display of an earlier version of the program. In this and similar scenarios, what is helpful to the human developer is a way to efficiently view the changes from one output display to another.

FIG. 1 illustrates a diagram 100 of a visual difference generator (VDG) 106. The VDG 106 can include a variety of internal systems and methods in the form of software and/or hardware modules. The VDG 106 can receive first and second images 102, 104 and generate a visual difference image 108. The first and second images 102, 104 can be in the form of screenshots of two different outputs of a computer program. For example, the computer program may be a website program and the images 102, 104 can be the different versions of the website generated from different versions of the website program code. The image 104 may differ from the image 102 in having one or more rows added to the top or the bottom, with the remaining contents, having stayed unchanged. Other example changes may also be present in images 102, 104.

While some embodiments may be described in the context of software development, any field of technology can benefit from the VDG 106, where images are provided as input and a visual difference image (VDI) 108 is received as output. The visual difference image 108 can be displayed in a variety of format. In one example, the VDI 108 can show a rough to general idea of the changes between the images 102, 104. For example, the changes can be displayed in red rectangles, while the unchanged portions can be displayed as blank. The VDI 108 can be detailed, or it can be a general graphical indicator of the changes between the images 102, 104. When the VDI 108 is implemented as a general graphical indicator of changes, the developer can quickly inspect the changes visually. It also makes the VDG 106 a performant and efficient component, which can be integrated and/or deployed in a software development environment, with minimized concerns for resource consumption of the VDG 106.

Figure 2:
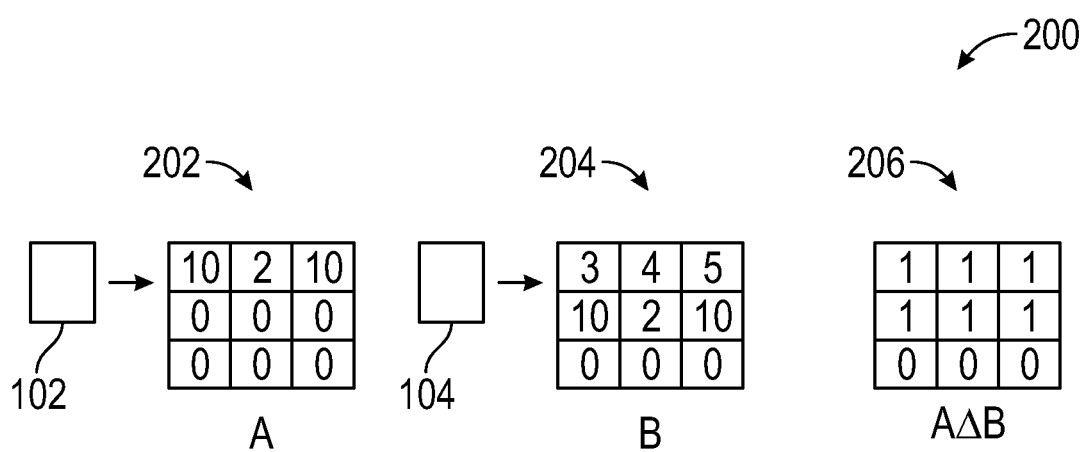
FIG. 2 illustrates a diagram of an implementation example of the operations of the VDG.

FIG. 2 illustrates a diagram 200 of an implementation example of the operations of the VDG 106 using matrices to represent pixels in images. An image on a two-dimensional screen can be represented as a matrix, where each screen pixel corresponds to a cell in the matrix. Each cell may include more details about the pixel, such as pixel coordinates, pixel color space (e.g., in RGB color space), pixel brightness and other parameters of a pixel. These pixel parameters can collectively be referred to as pixel values of a screen pixel. As an example, the first image 102 can be represented by a pixel matrix 202. The pixel matrix 202 is a 3×3 matrix and includes pixel values 10, 2, and 10 on the top row and 0 in the remaining cells. The second image 104 can be represented by a pixel matrix 204. The pixel matrix 204 is also a 3×3 matrix and includes pixel values 3, 4, 5 in the first row, 10, 2, 10, in the second row, and 0, 0, and 0 in the third row. The pixel matrices 202, 204 are provided as simplified examples for illustration purposes. In a typical case, a pixel matrix, can be more complicated, and can include more rows and columns. Furthermore, in the examples shown in the diagram 200 and elsewhere in this disclosure, the complexity of an image and its corresponding pixel data structure has been simplified in some cases, in order to aid in understanding the described embodiments. For example, the pixel values are simplified and shown as one number, where in a typical case, pixel values can be multidimensional and include other matrices. In some aspects, an image, like images 102, 104 may be represented by more complex data structures than two-dimensional pixel matrices. For example, multi-dimensional matrices, tensors and/or other data structures may be used to represent an image.

The VDG 106 can compare the pixel matrices 202, 204 and generate a difference matrix 206. The difference matrix 206 is generated by performing a cell-to-cell comparison of each cell in pixel matrices 202, 204. If pixel values in the same location have changed parameters from one image to another, the VDG 106 can note a change for that location. For example, the change may be a change in color, change in font, or change in text, or change in graphics represented in that location. Changes, such as color, font, text, graphics, and the like, cause a change in pixel values at the same location between two images.

Performing the cell-to-cell or pixel-to-pixel comparison between the pixel matrices 202 and 204 yields the difference matrix 206. In this comparison, pixel value in the cell Aij in pixel matrix 202 is compared against pixel value in the cell Bij in pixel matrix 204. If pixel values are the same, the cell Cij in difference matrix 206 is assigned a value 0, indicating the pixel value has not changed between the images 102, 104. If pixel values are different, the cell Cij in difference matrix 206 is assigned a value 1, indicating the pixel value has changed between the images 102, 104. In the example illustrated in the diagram 200, the pixel value A11 in pixel matrix 202 is 10 and the pixel value B11 in pixel matrix 204 is 3. Consequently, a value of 1 is assigned to difference matrix 206 cell C11. In this manner, the remaining cells of the difference matrix 206 are populated. In this example, the first two rows of the pixel matrices 202, 204 are different, so the first two rows of the difference matrix 206 are populated with 1s, indicating a visual change and/or difference in locations corresponding to pixels in the first two rows. The last rows of the pixel matrices 202, 204 have the same values, so the last row of the difference matrix 206 is populated with 0s, indicating no change between the images 202, 204 in locations corresponding to the pixels in the last row. The difference matrix 206 can be used to generate a VDI 108 to display a visual indication of changes to the user of the VDG 106. For example, locations corresponding to pixels in the first two rows can be highlighted with red rectangles, while the locations corresponding to pixels in the last row can be rendered blank (e.g., as white and/or background color) in the VDI 108. The details and graphical elements of the VDI 108 can depend on implementation and design choices.

In cases where new content rows are inserted and/or removed near the top and/or the bottom of an image, the change can cause the remaining elements in the image to shift up or down. That can result in the difference matrix 206 to show changes for nearly an entire image, when only a few rows have changed. This can cause a noisy VDI 108. In other words, a human observer, carefully comparing each element of the two images, may be able to detect that only a few rows have been changed and some portions of the image remain unchanged. However, this type of comparison may be burdensome for a human observer, and instead the human observer may prefer the VDI 108 to detect the unchanged portions of an image and not to flag them. The scenario of adding rows to or deleting rows from an image can occur with some frequency in some display outputs. For example, website developers can test different versions of their website program, where the different versions only modify the output website by inserting or deleting rows, while keeping the remaining content of the website unchanged. Still, the described embodiments will also apply to scenarios where rows are added or deleted, as well as scenarios where changes are to parts of a row. In each scenario, avoiding or minimizing noisy difference images are beneficial and increase the usability of the VDG 106.

Figure 3:
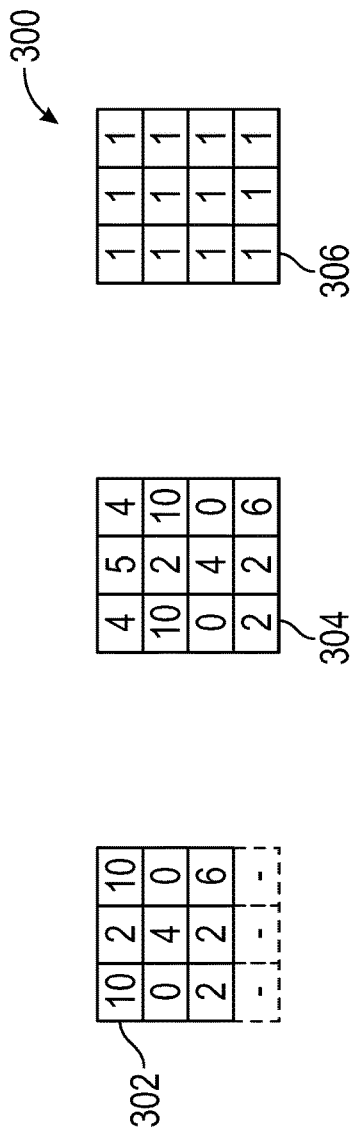
FIG. 3 illustrates a diagram of how a noisy difference image may be generated.

FIG. 3 illustrates a diagram 300 of how a noisy difference image may be generated. In the example shown in the diagram 300, the first image 104 may be represented as pixel matrix 302, and the second image as pixel matrix 304. The pixel matrices 302, 304 are equal in width, but pixel matrix 304 is longer in height. In this example, the image 304 may have changed from the image 302 by adding a row of text on the top of the image 304, when compared with the image 302. The additional row of text can reflect in the pixel matrix 304 in the form of an additional row of different pixel values on top of the pixel matrix 304, relative to the pixel matrix 302. A human observer comparing the images 102, 104, or the pixel matrices 302, 304 can detect that the images differ in only a row of text, or that matrices 302, 304 differ by only the top row. The difference matrix 306 is generated in the same manner as described above in relation to the diagram 200. To perform the comparison, the shorter pixel matrix 302 can be appended to make it equal in height to the longer pixel matrix 304. The appended rows can be populated with null values. A cell Aij in the pixel matrix 302 is compared against a cell Bij in the pixel matrix 304. If the pixel values in the cells are different, a cell Cij of the difference matrix 306 is populated with a "1," indicating a change in pixel values corresponding to that location. In the example shown, using this technique, every cell of the difference matrix 306 is populated with a "1". A VDI 108 generated from the difference matrix 306 can be a noisy visual difference image and may erroneously indicate the entirety of the image 104 has changed, relative to the image 102. The utility of such VDI 108 may be reduced in this scenario because the user may find it difficult to detect actual changes from changes due to shifting of the same content. In this and similar scenarios, the user can benefit from a VDI 108 that does not treat contents that merely have shifted as a changed content. For example, a VDI 108 that only highlights the inserted or removed content can be more beneficial to the user.

Figure 4:
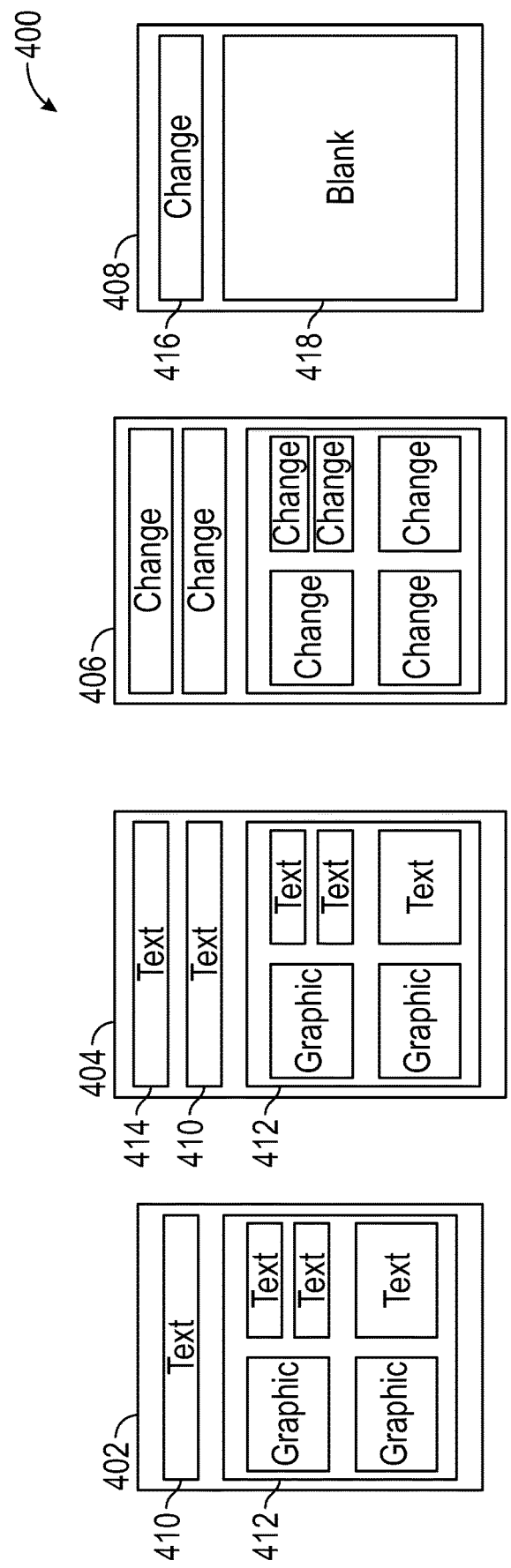
FIG. 4 illustrates example diagrams of input images and output visual difference images from a user's perspective.

FIG. 4 illustrates example diagrams 400 of images 102, 104 and VDIs 108, from the user's perspective. For example, a first image 102 can be a screenshot 402 of a website page, having text and graphics elements 410, 412. The second image 104 can be a screenshot 404 of a different version of the same website page. In this example, the screenshot 404 can be identical to the screenshot 402, but for having a row of text 414 inserted on top, above the row of text 410. In other words, in relation to the screenshot 402, the only change is the text row 414, which is inserted above the text row 410. Every other element between the two screenshots 402, 404 are identical. Insertion of the text row 414 has caused a vertical shift in the content of the screenshot 402, relative to the content of the screenshot 404.

Applying the VDI 108 generation technique described in diagrams 200, 300, in this scenario, can lead to the screenshot 406 as the VDI 108. The screenshot 406 indicates a change in nearly all aspects of the content because it does not account for vertical shifting of the same content. By contrast, the VDI 108, represented in the screenshot 408 indicates a change only in the content at the top of the web site page by highlighting or otherwise displaying a graphical change indicator at location 416 near or at the same location as the inserted row 414. The remaining sections of the screenshot 408 is the blank space 418, indicating no changes in those elements and those regions of the website page.

Figure 5:
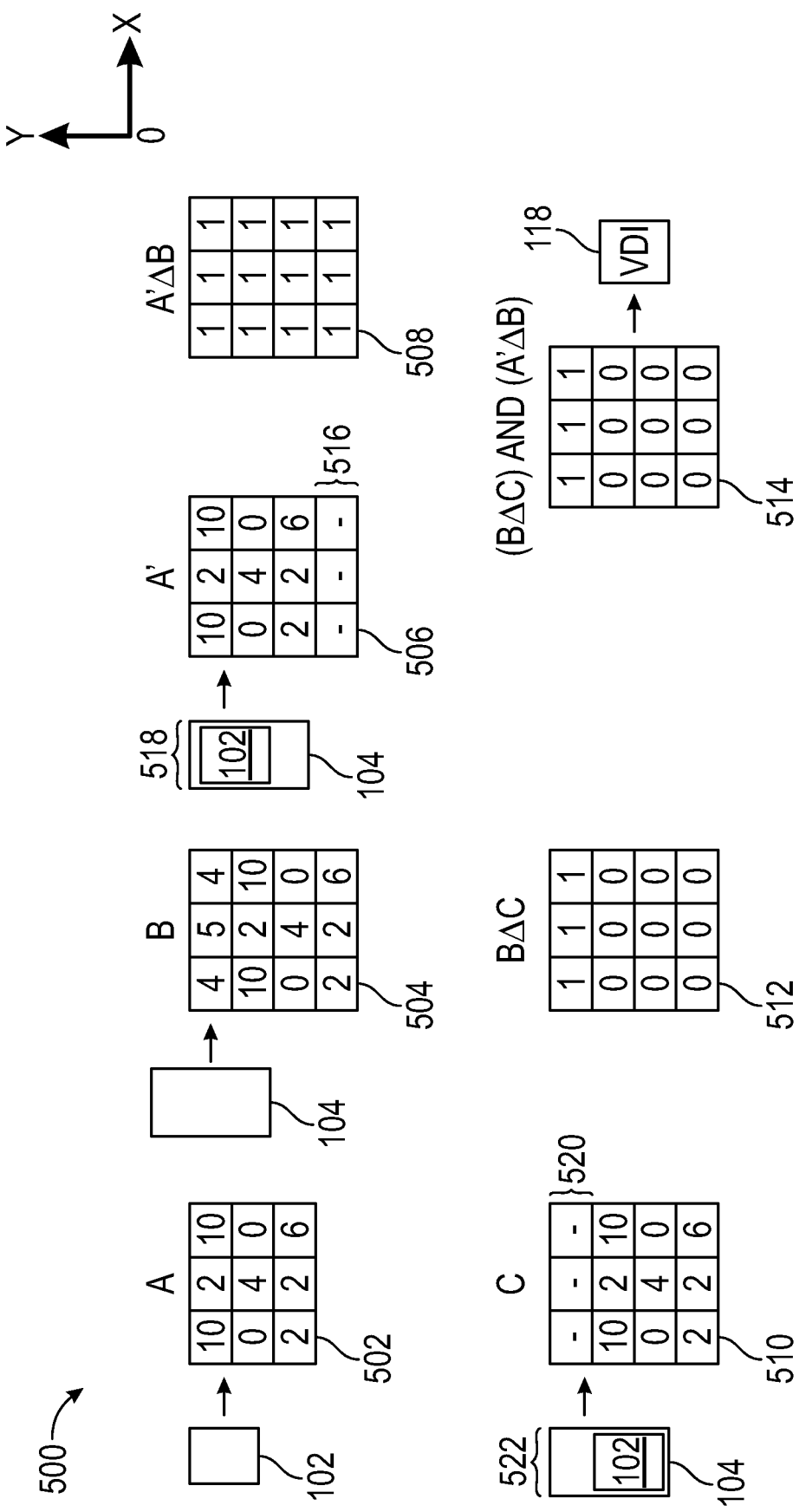
FIG. 5 illustrates example diagrams of pixel matrices and difference matrices to illustrate operations for generating a visual difference image.

FIG. 5 illustrates example diagrams 500 of pixel matrices and difference matrices to describe operations, which can detect the unhanged content between two images and flag the changes between the two images. A first image 102 can be represented with pixel matrix 502, and a second image 104 can be represented with pixel matrix 504. In this example, the first and second images 102, 104 are equal in width, but differ in height. The first image 102 is shorter than the second image 104, by one or more rows. The change can be from a revision that has caused an insertion of one or more rows in the second image 104, for example, an addition of a row of text in the second image 104. For simplicity, the pixel matrix 502, corresponding to the first image 102, is a 3×3 matrix, and the pixel matrix 504, corresponding to the second image 104 is a 4×3 matrix. The pixel matrix 504 is identical to the pixel matrix 502, but for the addition of the top row, ([4, 5, 4]) in this example.

While the embodiments may be described in terms of image operations, the techniques need not necessarily operate on a rendered image and can be deployed or operate on data structures underlying an image. These data structures can include pixel matrices or difference matrices, as described herein or other image data structures, such as tensors, arrays, and multidimensional matrices. In this context, operations on the images, matrices or image data structures may be interchangeably referenced, in order to describe the same operations. In other words, generating a display output image from an intermediary image data structure may be skipped or reserved until a later stage, where a final data structure underlying a VDI 108 is generated. Subsequently, the VDG 106 can be used to generate the VDI 108, based on an underlying data structure, derived from the described techniques.

Top-Clamped Image

The VDG 106 can generate a top-clamped image 518 by pinning, clamping, or overlapping the shorter of the two images on top of the longer of the two images. In other words, the top row of the longer image is the anchor for overlapping the two images. Rows can be added in the bottom of the top-clamped image 518 to make the top-clamped image 518 equal in height to the longer image 104. The added rows to the top-clamped image can be populated with null pixels. In terms of image data structure operations, for example, pixel matrix operations, top-clamping the pixel matrix 502 on the pixel matrix 504, and adding padded rows 516 on the bottom, can yield the top-clamped pixel matrix 506. In the example shown, the top-clamped pixel matrix 506 includes the pixel matrix 502 in the top three rows and a row of null pixel values added at the bottom. The added rows 516 can be referred to as padded rows 516.

The VDG 106 can generate a first difference matrix 508 by comparing pixels in the top-clamped image 518 with the pixels in the longer image 104. In terms of the image data structure operations, the first difference matrix 508 can be generated by performing a cell-to-cell comparison between pixel values of the top-clamped pixel matrix 506 and the longer pixel matrix 504. A cell of the first difference matrix 508 is populated with a "1" when the same cell in the top-clamped pixel matrix 506 and the longer pixel matrix 504 have different pixel values. The cell is populated with a "0" when the same cell in the top-clamped pixel matrix 506 and the longer pixel matrix 504 have the same pixel value. In this example, the first difference matrix 508 is populated with all "1s" as each cell between the top-clamped matrix 506 and the longer pixel matrix 504 have different pixel values.

The first difference matrix 508 can be of the same dimensions as the dimensions of the longer image 104. For example, the first difference matrix 508 can include a number of cells equal to the number of pixels in the longer image 104. The cells in the first difference matrix 508 can be in the same arrangement and dimensions as the longer image 104. For example, if the longer image 104 is a 4×3 matrix, the first difference matrix 508 is also a 4×3 matrix.

Bottom-Clamped Image

The VDG 106 can generate a bottom-clamped image 522 by pinning, clamping, or overlapping the shorter of the two images on the bottom of the longer of the two images. In other words, the bottom row of the longer image is the anchor for overlapping the two images. Rows can be added at the top of the bottom-clamped image 522 to make the bottom-clamped image 522 equal in height to the longer image 104. The added rows to the bottom-clamped image can be populated with null pixels. In terms of image data structure operations, for example, pixel matrix operations, bottom-clamping the pixel matrix 502 on the pixel matrix 504, and adding padded rows 520 on the top, can yield the bottom-clamped pixel matrix 510. In the example shown, the bottom-clamped pixel matrix 510 includes the pixel matrix 502 in the bottom three rows and a row of null pixel values added at the top. The added rows 520 can be referred to as padded rows 520.

The VDG 106 can generate a second difference matrix 512 by comparing pixels in the bottom-clamped image 522 with the pixels in the longer image 104. In terms of the image data structure operations, the second difference matrix 512 can be generated by performing a cell-to-cell comparison between pixel values of the bottom-clamped pixel matrix 510 and the longer pixel matrix 504. A cell of the second difference matrix 512 is populated with a "1" when the same cell in the bottom-clamped pixel matrix 510 and the longer pixel matrix 504 have different pixel values. The cell is populated with a "0" when the same cell in the bottom-clamped pixel matrix 510 and the longer pixel matrix 504 have the same pixel value. In this example, the second difference matrix 512 is populated with "1s" on the top row and "0s" in all other rows, as the bottom-clamped matrix 510 differs from the longer pixel matrix 504 only in pixel values in the first row.

The second difference matrix 512 can be of the same dimensions as the dimensions of the longer image 104. For example, the second difference matrix 512 can include a number of cells equal to the number of pixels in the longer image 104. The cells in the second difference matrix 512 can be in the same arrangement and dimensions as the longer image 104. For example, if the longer image 104 is a 4×3 matrix, the second difference matrix 512 is also a 4×3 matrix.

Third-Difference Matrix

The VDG 106 can generate a third difference matrix 514 by performing a logical AND operation between the first and second difference matrices 508 and 512. The logical AND operation can be a cell-to-cell AND operation. For example, if the first difference matrix 508 is expressed as Mij, the second difference matrix is expressed as Nij, and the third difference matrix is expressed as Pij, then, Pij=(Mij AND Nij), where "i" refers to rows of the matrices and "j" refer to columns of the matrices. A cell in the third difference matrix 514 is a "1," when the same cell in both the first and second difference matrices 508, 512 have a value of "1." A cell in the third difference matrix 514 has a value of "0," when the same cell in any of the first and second difference matrices have a value of "0." The third difference matrix 514 can be used to generate a VDI 108. Pixels and/or locations corresponding to cells having a value of "1" in the third difference matrix 514 include a change between images 102, 104 and can be so indicated by a graphical indication, such as highlighting, colors, boxes, etc. In one implementation, the VDI 108 can be a blank page with only the changed sections shown on the blank page, with some graphical indicators, such as the content highlighted, underlined, boxed or otherwise made conspicuous for the user to efficiently discern the change between the images 102, 104.

The terms "top" and "bottom" in the context of the described embodiments can be based on a reference point in two-dimensional space of an image, for example, the origin in the Cartesian coordinate system. The reference point or the origin of the Cartesian coordinate system can be the cross section of a horizontal axis, X, and a vertical axis, Y, having coordinates (0,0) at a corner location in the image. In this context, the "top" of the image are locations on the image with pixels having a maximum vertical distance Y in the image relative to the X axis and the "bottom" of the image are locations with pixels having a minimum vertical distance Y (or vertical distance 0) relative to the X axis.

Example Method of Generating a Visual Difference Image

Figure 6:
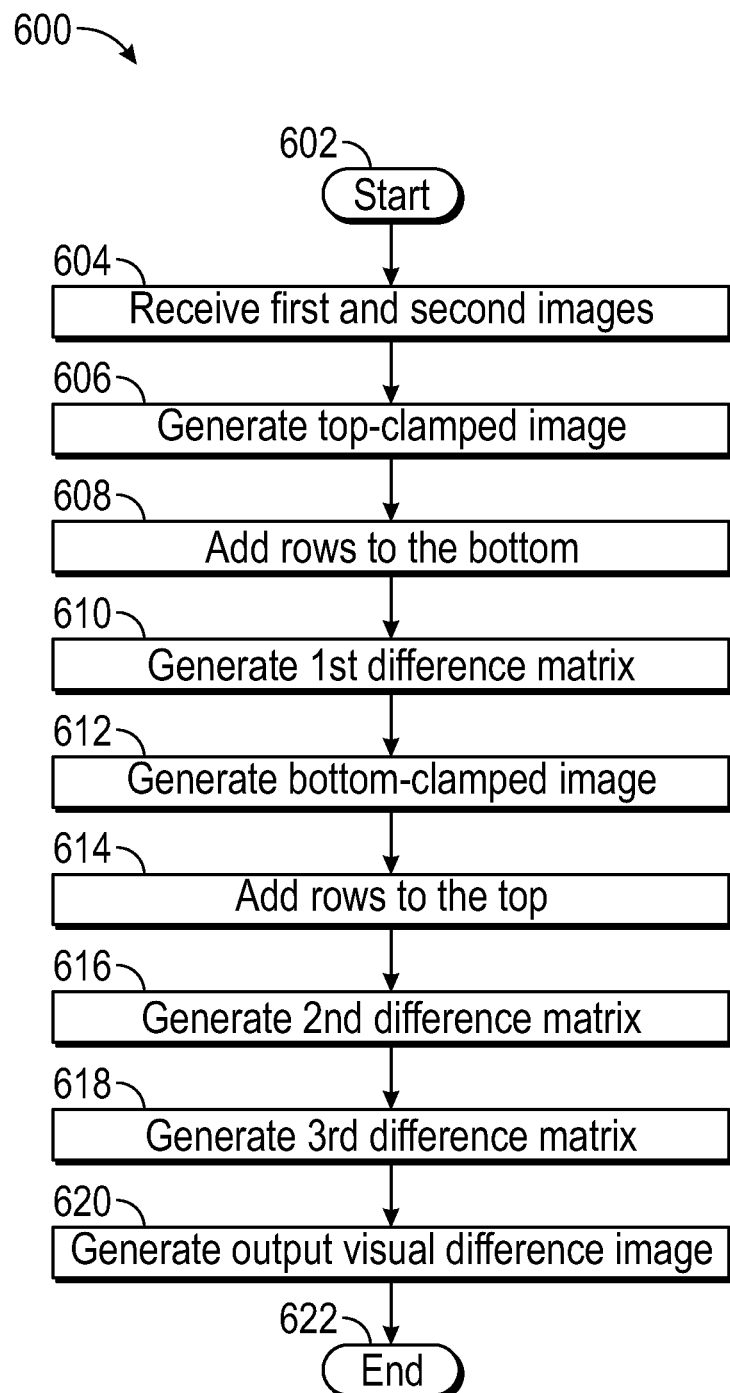
FIG. 6 illustrates an example method of generating and displaying a visual difference image.

FIG. 6 illustrates an example method 600 of generating and displaying a VDI 108. The method starts at step 602. At step 604, the VDG 106 receives first and second images 102, 104. The images have the same width but have different heights. The first image 102 is shorter than the second image 104. The first image 102 is from the pixel matrix 502. The second image 104 is from the pixel matrix 504. At step 606, the VDG 106 generates a top-clamped image by clamping the shorter image 102 on the top row of the longer image 104. At step 608, the VDG 106 adds null pixels to the bottom of the top-clamped image to make the top-clamped image the same height as the longer image 104. In terms of image data structure operations, steps 606 and 608 include generating the top-clamped pixel matrix 506, as described above in relation to the embodiments of FIG. 5. At step 610, the VDG 106 generates the first difference matrix 508, by performing a cell-to-cell comparison of the top-clamped pixel matrix 506 with the pixel matrix 504 of the longer image 104.

At step 612, the VDG 106 generates a bottom-clamped image by clamping the shorter image 102 on the bottom row of the longer image 104. At step 614, the VDG 106 adds null pixels to the top of the bottom-clamped image to make the bottom-clamped image the same height as the longer image 104. In terms of image data structure operations, steps 612 and 614 include generating the bottom-clamped pixel matrix 510, as described above in relation to the embodiments of FIG. 5. At step 616, the VDG 106 generates the second difference matrix 512, by performing a cell-to-cell comparison of the bottom-clamped pixel matrix 510 with the pixel matrix 504 of the longer image 104.

At step 618, the VDG 106 generates the third difference matrix 514, by performing a cell-to-cell AND operation between the first and second difference matrices 508 and 512. At step 620, the VDG 106 generates a VDI 108 based on the third difference matrix 514 and displays the VDI 108 to a user. The method ends at step 622.

Example Implementation Mechanism Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 7:
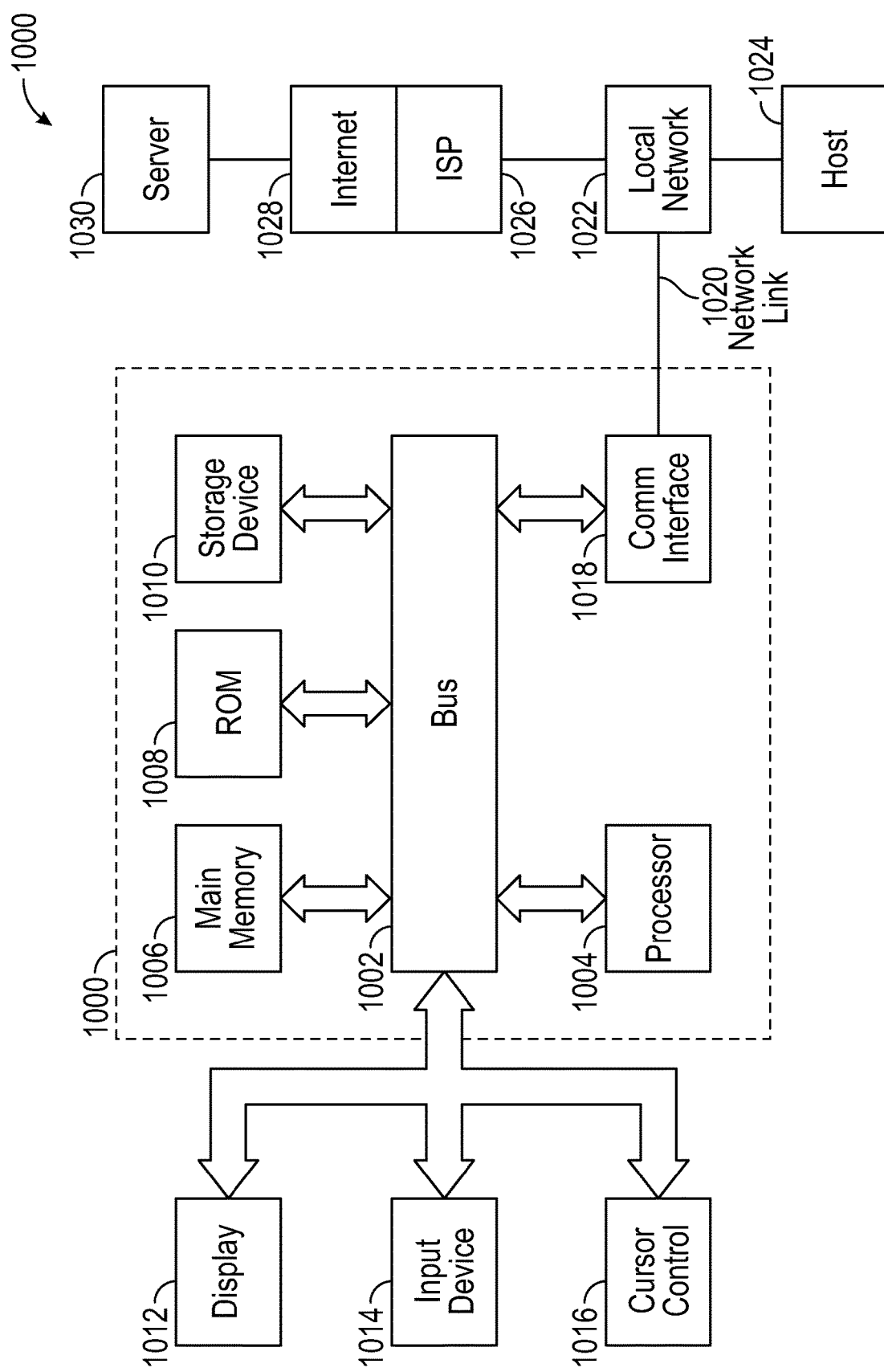
FIG. 7 illustrates an example data flow diagram of the operations of an infrastructure enabling a remote session using a remote device, using a video capturing API.

For example, FIG. 7 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: receiving first and second images, having same width and different heights; generating a top-clamped image by clamping the shorter of the first and second images on top of the longer of the first and second images; adding rows in bottom of the top-clamped image for rows not having overlapping rows; generating a first difference matrix by comparing pixels in the top-clamped image with pixels in the longer of the first and second images; generating a bottom-clamped image by clamping the shorter of the first and second images on bottom of the longer of the first and second images; adding rows on top of the bottom-clamped image for rows not having overlapping rows; generating a second difference matrix by comparing pixels in the bottom-clamped image with pixels in the longer of the first and second images; generating a third difference matrix by performing a logical AND between the first and second difference matrices; generating a visual difference image based on the third difference matrix; and displaying the visual difference image to a user.

Example 2: The method of Example 1, wherein the top-clamped image comprises a height equal to the height of the longer of the first and second images, top rows from the shorter of the first and second images and padded bottom rows.

Example 3: The method of any or all of Examples 1 and 2, wherein the bottom-clamped image comprises a height equal to the height of the longer of the first and second images, bottom rows from the shorter of the first and second image and padded top rows.

Example 4: The method of some or all of Examples 1-3, wherein the first difference matrix comprises cells equal to the number of pixels in the longer of the first and second images, wherein generating the first difference matrix comprises pixel to pixel comparison between the top-clamped image with the longer image; and generating a 1 for pixels that are different and a 0 for pixels that are the same.

Example 5: The method of some or all of Examples 1-4, wherein the second difference matrix comprises cells equal to the number of pixels in the longer of the first and second images, wherein generating the second difference image comprises pixel to pixel comparison between the bottom-clamped image with the longer image; and generating a 1 for pixels that are different and a 0 for pixels that are the same.

Example 6: The method of some or all of Examples 1-5, wherein generating the third difference matrix comprises a cell-to-cell comparison between the first and second difference matrices; and generating a 1 when both cell values are 1 and a 0 when a cell value is 0.

Example 7: The method of some or all of Examples 1-6, wherein adding rows at the bottom of the top-clamped image and adding rows at the top of the bottom-clamped image comprises adding pixels, having null pixel values.

Example 8: A non-transitory computer storage that stores executable program instructions that, when executed by one or more computing devices, configure the one or more computing devices to perform operations comprising: receiving first and second images, having same width and different heights; generating a top-clamped image by clamping the shorter of the first and second images on top of the longer of the first and second images; adding rows in bottom of the top-clamped image for rows not having overlapping rows; generating a first difference matrix by comparing pixels in the top-clamped image with pixels in the longer of the first and second images; generating a bottom-clamped image by clamping the shorter of the first and second images on bottom of the longer of the first and second images; adding rows on top of the bottom-clamped image for rows not having overlapping rows; generating a second difference matrix by comparing pixels in the bottom-clamped image with pixels in the longer of the first and second images; generating a third difference matrix by performing a logical AND between the first and second difference matrices; generating a visual difference image based on the third difference matrix; and displaying the visual difference image to a user.

Example 9: The non-transitory computer storage of Example 8, wherein the top-clamped image comprises a height equal to the height of the longer of the first and second images, top rows from the shorter of the first and second images and padded bottom rows.

Example 10: The non-transitory computer storage of any or all of Examples 8 and 9, wherein the bottom-clamped image comprises a height equal to the height of the longer of the first and second images, bottom rows from the shorter of the first and second image and padded top rows.

Example 11: The non-transitory computer storage of some or all of Examples 8-10, wherein the first difference matrix comprises cells equal to the number of pixels in the longer of the first and second images, wherein generating the first difference matrix comprises pixel to pixel comparison between the top-clamped image with the longer image; and generating a 1 for pixels that are different and a 0 for pixels that are the same.

Example 12: The non-transitory computer storage of some or all of Examples 8-11, wherein the second difference matrix comprises cells equal to the number of pixels in the longer of the first and second images, wherein generating the second difference image comprises pixel to pixel comparison between the bottom-clamped image with the longer image; and generating a 1 for pixels that are different and a 0 for pixels that are the same.

Example 13: The non-transitory computer storage of some or all of Examples 8-12, wherein generating the third difference matrix comprises a cell-to-cell comparison between the first and second difference matrices; and generating a 1 when both cell values are 1 and a 0 when a cell value is 0.

Example 14: The non-transitory computer storage of some or all of Examples 8-13, wherein adding rows at the bottom of the top-clamped image and adding rows at the top of the bottom-clamped image comprises adding pixels, having null pixel values.

Example 15: A system comprising a processor, the processor configured to perform operations comprising: receiving first and second images, having same width and different heights; generating a top-clamped image by clamping the shorter of the first and second images on top of the longer of the first and second images; adding rows in bottom of the top-clamped image for rows not having overlapping rows;

generating a first difference matrix by comparing pixels in the top-clamped image with pixels in the longer of the first and second images; generating a bottom-clamped image by clamping the shorter of the first and second images on bottom of the longer of the first and second images; adding rows on top of the bottom-clamped image for rows not having overlapping rows; generating a second difference matrix by comparing pixels in the bottom-clamped image with pixels in the longer of the first and second images; generating a third difference matrix by performing a logical AND between the first and second difference matrices; generating a visual difference image based on the third difference matrix; and displaying the visual difference image to a user.

Example 16: The system of Example 15, wherein the top-clamped image comprises a height equal to the height of the longer of the first and second images, top rows from the shorter of the first and second images and padded bottom rows.

Example 17: The system of any or all of Examples 15 and 16, wherein the bottom-clamped image comprises a height equal to the height of the longer of the first and second images, bottom rows from the shorter of the first and second image and padded top rows.

Example 18: The system of some or all of Examples 15-17, wherein the first difference matrix comprises cells equal to the number of pixels in the longer of the first and second images, wherein generating the first difference matrix comprises pixel to pixel comparison between the top-clamped image with the longer image; and generating a 1 for pixels that are different and a 0 for pixels that are the same.

Example 19: The system of some or all of Examples 15-18, wherein the second difference matrix comprises cells equal to the number of pixels in the longer of the first and second images, wherein generating the second difference image comprises pixel to pixel comparison between the bottom-clamped image with the longer image; and generating a 1 for pixels that are different and a 0 for pixels that are the same.

Example 20: The system of some or all of Examples 15-19, wherein generating the third difference matrix comprises a cell-to-cell comparison between the first and second difference matrices; and generating a 1 when both cell values are 1 and a 0 when a cell value is 0.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
    receiving first and second images;
    generating a top-clamped image by adding rows to bottom of the shorter of the first and second images;
    generating a first difference matrix by comparing pixels in the top-clamped image with pixels in the longer of the first and second images;
    generating a bottom-clamped image by adding rows to top of the shorter of the first and second images;
    generating a second difference matrix by comparing pixels in the bottom-clamped image with pixels in the longer of the first and second images;
    generating a third difference matrix by comparing the first and second difference matrices; and
    generating a visual difference image based on the third difference matrix.

2. The method of claim 1, wherein the top-clamped image comprises a height equal to the height of the longer of the first and second images, top rows from the shorter of the first and second images and padded bottom rows.

3. The method of claim 1, wherein the bottom-clamped image comprises a height equal to the height of the longer of the first and second images, bottom rows from the shorter of the first and second image and padded top rows.

4. The method of claim 1, wherein the first difference matrix comprises cells equal to the number of pixels in the longer of the first and second images, wherein generating the first difference matrix comprises pixel to pixel comparison between the top-clamped image with the longer image; and generating a 1 for pixels that are different and a 0 for pixels that are the same.

5. The method of claim 1, wherein the second difference matrix comprises cells equal to the number of pixels in the longer of the first and second images, wherein generating the second difference image comprises pixel to pixel comparison between the bottom-clamped image with the longer image; and generating a 1 for pixels that are different and a 0 for pixels that are the same.

6. The method of claim 1, wherein generating the third difference matrix comprises a cell-to-cell comparison between the first and second difference matrices; and generating a 1 when both cell values are 1 and a 0 when a cell value is 0.

7. The method of claim 1, wherein adding rows at the bottom of the top-clamped image and adding rows at the top of the bottom-clamped image comprises adding pixels, having null pixel values.

8. The method of claim 1, wherein the first and second images are screenshots of different versions of same webpage.

9. A non-transitory computer storage that stores executable program instructions that, when executed by one or more computing devices, configure the one or more computing devices to perform operations comprising:
    receiving first and second images;
    generating a top-clamped image by adding rows to bottom of the shorter of the first and second images;
    generating a first difference matrix by comparing pixels in the top-clamped image with pixels in the longer of the first and second images;
    generating a bottom-clamped image by adding rows to top of the shorter of the first and second images;
    generating a second difference matrix by comparing pixels in the bottom-clamped image with pixels in the longer of the first and second images;
    generating a third difference matrix by comparing the first and second difference matrices; and
    generating a visual difference image based on the third difference matrix.

10. The non-transitory computer storage of claim 9, wherein the top-clamped image comprises a height equal to the height of the longer of the first and second images, top rows from the shorter of the first and second images and padded bottom rows.

11. The non-transitory computer storage of claim 9, wherein the bottom-clamped image comprises a height equal to the height of the longer of the first and second images, bottom rows from the shorter of the first and second image and padded top rows.

12. The non-transitory computer storage of claim 9, wherein the first difference matrix comprises cells equal to the number of pixels in the longer of the first and second images, wherein generating the first difference matrix comprises pixel to pixel comparison between the top-clamped image with the longer image; and generating a 1 for pixels that are different and a 0 for pixels that are the same.

13. The non-transitory computer storage of claim 9, wherein the second difference matrix comprises cells equal to the number of pixels in the longer of the first and second images, wherein generating the second difference image comprises pixel to pixel comparison between the bottom-clamped image with the longer image; and generating a 1 for pixels that are different and a 0 for pixels that are the same.

14. The non-transitory computer storage of claim 9, wherein generating the third difference matrix comprises a cell-to-cell comparison between the first and second difference matrices; and generating a 1 when both cell values are 1 and a 0 when a cell value is 0.

15. The non-transitory computer storage of claim 9, wherein adding rows at the bottom of the top-clamped image and adding rows at the top of the bottom-clamped image comprises adding pixels, having null pixel values.

16. A system comprising a processor, the processor configured to perform operations comprising:
receiving first and second images;
generating a top-clamped image by adding rows to bottom of the shorter of the first and second images;
generating a first difference matrix by comparing pixels in the top-clamped image with pixels in the longer of the first and second images;
generating a bottom-clamped image by adding rows to top of the shorter of the first and second images;
generating a second difference matrix by comparing pixels in the bottom-clamped image with pixels in the longer of the first and second images;
generating a third difference matrix by comparing the first and second difference matrices;
generating a visual difference image based on the third difference matrix.

17. The system of claim 16, wherein the top-clamped image comprises a height equal to the height of the longer of the first and second images, top rows from the shorter of the first and second images and padded bottom rows.

18. The system of claim 16, wherein the bottom-clamped image comprises a height equal to the height of the longer of the first and second images, bottom rows from the shorter of the first and second image and padded top rows.

19. The system of claim 16,
wherein the first difference matrix comprises cells equal to the number of pixels in the longer of the first and second images,
wherein generating the first difference matrix comprises pixel to pixel comparison between the top-clamped image with the longer image, and generating a 1 for pixels that are different and a 0 for pixels that are the same,
wherein the second difference matrix comprises cells equal to the number of pixels in the longer of the first and second images,
wherein generating the second difference image comprises pixel to pixel comparison between the bottom-clamped image with the longer image, and generating a 1 for pixels that are different and a 0 for pixels that are the same,
wherein generating the third difference matrix comprises a cell-to-cell comparison between the first and second difference matrices and generating a 1 when both cell values are 1 and a 0 when a cell value is 0.

20. The system of claim 16, wherein the first and second images are screenshots of different versions of same webpage.

\* \* \* \* \*